(12) United States Patent
Goldstein (10) Patent No.: US 11,761,472 B2
(45) Date of Patent: Sep. 19, 2023

(54) NUT RESTRAINER, CENTERING TOOL, AND METHODS OF USE

(71) Applicant: Atlas Tube Connections, LLC, Chicago, IL (US)

(72) Inventor: Edward Goldstein, Douglaston, NY (US)

(73) Assignee: Atlas Tube Connections, LLC, Chicago, IL (US)

( * ) Notice: Subject to any disclaimer, the term of this patent is extended or adjusted under 35 U.S.C. 154(b) by 0 days.

(21) Appl. No.: 17/547,649

(22) Filed: Dec. 10, 2021

(65) Prior Publication Data

US 2022/0099134 A1 Mar. 31, 2022

Related U.S. Application Data

(63) Continuation of application No. 16/675,295, filed on Nov. 6, 2019, now Pat. No. 11,225,993.

(51) Int. Cl.
| | |
|---|---|
| *F16B 39/02* | (2006.01) |
| *F16B 37/08* | (2006.01) |
| *F16B 39/01* | (2006.01) |
| *F16B 21/06* | (2006.01) |

(52) U.S. Cl.
CPC ............. *F16B 39/02* (2013.01); *F16B 21/06* (2013.01); *F16B 37/0842* (2013.01); *F16B 39/01* (2013.01)

(58) Field of Classification Search
CPC ...... F16B 39/02; F16B 21/06; F16B 37/0842; F16B 39/01; F16B 5/0225; F16B 37/044; F16B 43/00; F16B 4/004
See application file for complete search history.

(56) References Cited

U.S. PATENT DOCUMENTS

| | | | | |
|---|---|---|---|---|
| 1,484,769 | A * | 2/1924 | France | F16B 39/14 |
| | | | | 411/937 |
| 1,515,657 | A * | 11/1924 | Cochran | F16B 39/14 |
| | | | | 411/247 |
| 2,460,131 | A * | 1/1949 | Kendrick | F16B 39/38 |
| | | | | 411/247 |
| 2,539,172 | A | 1/1951 | Andrews | |
| 2,585,728 | A * | 2/1952 | Bedford, Jr. | F16B 37/044 |
| | | | | 411/970 |
| 2,639,172 | A * | 5/1953 | Leonard, Jr. | F16C 7/04 |
| | | | | 403/220 |
| 3,965,954 | A * | 6/1976 | Lofredo | F16B 39/04 |
| | | | | 411/959 |

(Continued)

*Primary Examiner* — Lawrence Averick
(74) *Attorney, Agent, or Firm* — BakerHostetler (57) ABSTRACT

In accordance with one or more embodiments of the invention, nut restrainers, centering tools, and methods of use are presented, particularly as applied to high strength bolted connections. Nut restrainers may have an interior profile including a circular profile section and a regular hexagonal profile section, a nut inserted into the nut restrainer may have lateral freedom of movement, and the nut restrainer may have a top plane with one or more centering protrusions. A centering tool for positioning a nut restrainer may have a non-circular head section, a cylindrical positioning section, a threaded section, and a cylindrical restrainer positioning section; a method of positioning a nut restrainer coaxial with a bolt hole using the centering tool.

20 Claims, 8 Drawing Sheets

(56) References Cited

U.S. PATENT DOCUMENTS

| | | | | |
|---|---|---|---|---|
| 6,036,804 A | * | 3/2000 | Rayburn | ................ F16B 37/14 156/224 |
| 7,607,878 B2 | * | 10/2009 | Whipple | ................ F16B 39/04 411/122 |
| 8,439,620 B2 | * | 5/2013 | Mellyn | ............... F16B 37/0807 411/188 |
| 2005/0249571 A1 | * | 11/2005 | Whipple | ................ F16B 35/02 411/195 |
| 2011/0318135 A1 | * | 12/2011 | Mellyn | ............... F16B 37/0807 411/366.1 |

* cited by examiner

NUT RESTRAINER, CENTERING TOOL, AND METHODS OF USE

CROSS-REFERENCE TO RELATED APPLICATIONS

This application is a continuation of U.S. patent application Ser. No. 16/675,295, filed Nov. 6, 2019, which is incorporated herein by reference in its entirety.

BACKGROUND OF THE INVENTION

Field of Invention

The invention disclosed herein generally relates to high strength bolted connections. More specifically, the invention disclosed herein relates to nut restrainers, centering tools, and methods of use.

Description of Related Art

Use of high-strength bolted connections (including, for example, bolts conforming to ASTM F3125, nuts conforming the ASTM A563, and washers conforming to ASTM F436) is widespread in the construction industry to join steel elements of buildings, bridges and other structures. Bolted assembly is often preferred to the use of welding due to the simplicity and speed of installing bolts on a construction site. However, the proper installation of high-strength bolted connections typically requires access to both sides of the parts being connected, making the use of high strength bolts impossible in many cases. In other cases, engineers may sacrifice material efficiency to facilitate the use of bolted connections, for example, using steel members with I-shaped cross-sections instead of those with more efficient box-shaped cross sections.

Several products and practices exist to address the need for bolted connections when access is available from one side only. However, all suffer from drawbacks when compared to typical high strength bolting. These include the following three products and practices:

Welding a nut to the inaccessible side of the part in advance of site assembly. This approach allows the bolt to be tightened from one side but violates the building code-referenced standards stating that nuts conforming to ASTM A563 shall not be welded. It also reduces installation tolerances by fixing the nut's location with respect to the bolt hole.

Blind bolts, which come in a wide variety of proprietary and non-proprietary forms, can be installed and tightened from one side, but generally have smaller allowable load-carrying capacities than traditional high strength bolted connections. Blind bolts are generally more complex and expensive than high strength bolts, and typically cannot be used in connections where the bolt must tightly clamp the pieces of steel being joined.

Tapped holes have threads cut into the interior of the hole in the material on the inaccessible side. This approach requires high precision, increases fabrication time, reduces installation tolerances, and typically cannot be used in connections where the bolt must tightly clamp the pieces of steel being joined.

The existence of a product that allowed for the installation of high strength bolted connections from one side at low cost, without reductions in load-carrying capacity, and while preserving installation tolerances, would allow more efficient structures to be erected at a lower cost than is possible with current practice.

BRIEF SUMMARY OF EMBODIMENTS OF THE INVENTION

In accordance with one or more embodiments of the invention, nut restrainers, centering tools, and methods of use are disclosed. Certain of the aspects include a nut restrainer for inserting a nut within the nut restrainer and thereafter affixing the nut restrainer to a substrate plate over a bolt hole, for subsequent installation of a bolt with access from only one side of the substrate plate, the nut restrainer comprising: a substantially cup-shaped portion of material having an interior profile and having a top plane disposed away from a substrate plate; the interior profile comprising a circular profile section and a regular hexagonal profile section, the regular hexagonal profile section accepting insertion of a nut; where the nut inserted into and restrained with the nut restrainer has freedom of movement in all lateral directions substantially equal to the bolt hole tolerance; where the top plane of the nut restrainer has at least one centering protrusion, each centering protrusion having a shape and a thickness, the shape of each centering protrusion having an arced inner portion, arced inner portions of each centering protrusion substantially sharing the same focus point substantially coincident with the center of the bolt hole, the shape and thickness of each centering protrusion allowing each centering protrusion to bend so as not to impede the tip of the bolt if the bolt extends past the nut and comes into contact with the centering protrusions during and after tightening; and where no nut restrainer material prevents direct contact between any of: the nut and a washer, a washer and the substrate material, or the shank of the bolt and either the substrate plate or a fastened plate.

Other aspects include where the regular hexagonal profile section has filleted vertices, each of the filleted vertices having a common radius, the radius of each of the filleted vertices being substantially equal to the bolt hole tolerance, the filleted vertices ensuring that the freedom of movement of the nut is substantially equal in all lateral directions, the regular hexagonal profile having a width substantially equal to the sum of the nut width plus twice the bolt hole tolerance. Some aspects include where the circular profile section accommodates a washer, and wherein the diameter of the circular profile section is larger than the nominal diameter of the washer by approximately a minimum amount sufficient to accommodate washer size variation. In some aspects there are two centering protrusions, where the centering protrusions are connected to the balance of the nut restrainer material by isthmuses. In some aspects the nut is affixed to the substrate plate via welding.

Some aspects of the invention include a centering tool for positioning the nut restrainer coaxial with a bolt hole while fastening the nut restrainer to a substrate plate, where the freedom of movement allows the nut to accept a bolt inserted off center with regard to the bolt hole, the centering tool comprising: a non-circular head section for allowing the centering tool to be tightened, binding the centering tool to the nut, and immobilizing the nut and the centering tool during installation of the nut retainer; a cylindrical positioning section, the cylindrical positioning section having a diameter nominally smaller than the bolt hole diameter, such that when the centering tool is bound to the nut, the cylindrical positioning section fits tightly within the bolt hole to ensure that the centering tool and the bolt hole are substantially coaxial; a threaded section with thread pitch and thread size substantially equal to that of the bolt which is to be received by the nut, thereby ensuring that the centering tool remains within the bolt hole during installation of the nut restrainer; and a cylindrical restrainer positioning section, the cylindrical restrainer positioning section having a diameter nominally less than an internal diameter of the nut and substantially equal to the diameter of the arced inner portions of the centering protrusions, the cylindrical restrainer positioning section engaging with each of the centering protrusions. Some aspects of the centering tool include where the non-circular head section allows the centering tool to be hand-tightened.

Some aspects include a method of positioning the nut restrainer coaxial with a bolt hole using the centering tool, the method comprising: inserting the centering tool into a bolt hole from the side opposite that which the nut restrainer will be affixed; tightening the centering tool to the substrate plate by engaging the threaded portion of the centering tool with a nut, thereby immobilizing both the nut and the centering tool; placing the nut restrainer on top of the immobilized nut, with the bottom of the nut restrainer in contact with the substrate plate, and with the centering protrusions engaged with the cylindrical restrainer positioning section of the centering tool; affixing the nut restrainer to the substrate plate; and removing the centering tool from the nut, and withdrawing it from the bolt hole.

Some aspects include where tightening the centering tool to the substrate plate comprises hand-tightening the centering tool to the substrate plate. Some aspects further comprise inserting a washer between the nut and the substrate plate prior to engaging the threaded section of the centering tool with the nut. And in some aspects, affixing the nut restrainer to the substrate plate comprises welding the nut restrainer to the substrate plate.

BRIEF DESCRIPTION OF THE DRAWINGS

For a more complete understanding of various embodiments of the present invention, reference is now made to the following descriptions taken in connection with the accompanying drawings in which:

FIGS. 7b and 7c illustrate a downward view and cross sectional view, respectively, of the embodiment of the invention shown in FIG. 7a.

DETAILED DESCRIPTION OF EMBODIMENTS OF THE INVENTION

The inventions disclosed herein allow for the installation of high strength bolted connections with access from only one side by confining the nut within a holder that is affixed (by way of nonlimiting example, in some embodiments welded) to the base material in advance of erection of structures including in some embodiments steel.

Figure 1A:
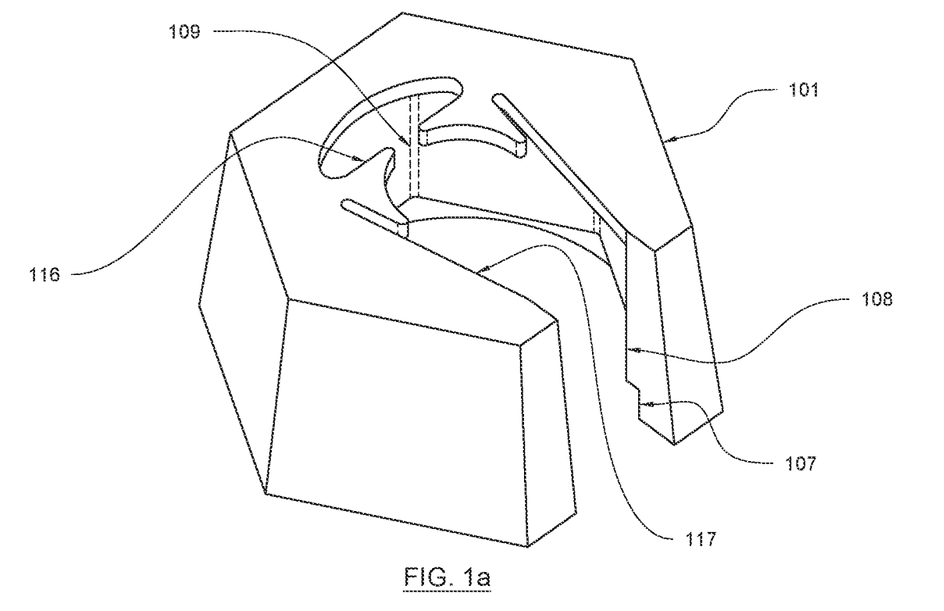
FIG. 1a illustrates a three-dimensional view of a nut restrainer according to embodiments of the invention from the top and side.

FIG. 1a illustrates a three-dimensional view of a nut restrainer according to embodiments of the invention from the top and side. Exemplary nut restrainer 101 is illustrated, with the relative locations of circular profile 107, hexagonal profile 108, filleted vertices 109, and top plane 117, on which centering protrusions 116 are shown. Centering protrusions 116 are illustrated with an isthmus-shaped connection to the balance of top plane 117. Top plane 117 as illustrated in FIG. 1a is one of many possible forms that top planes might take. As illustrated in FIG. 1, top plane 117 incorporates at least four desirable attributes. First, top plane 117 allows centering protrusions 116 to bend away from the tip of a passing bolt 106 (illustrated in at least FIGS. 6a, 6b, and 7c) while imparting very little force on bolt 106. This characteristic may be achieved with many different forms of top plane 117, by varying both the form and thickness of the top plane 117. One potential drawback of reducing the thickness of top plane 117 may be making nut restrainer 101 less robust, and potentially resulting in additional numbers of pieces being discarded or improperly aligned due to damage incurred during shipping or handling. Second, top plane 117 as illustrated in FIG. 1 allows centering protrusions 116 to engage a large portion of the circumference of centering tool 111 (illustrated in FIGS. 4a and 4b), providing greater assurance to a user that the centering protrusions are properly engaged with centering tool 111, and thus that nut restrainer 101 is properly aligned with bolt hole 110 (illustrated in FIGS. 5a, 5b, 6a, and 6b), when compared to a top plane form that engages a smaller portion of the circumference of the centering tool. Third, the two centering protrusions 116 illustrated in FIG. 1a, top plane 117 of nut restrainer 101 may simultaneously engage with centering tool 111. If either of the centering protrusions 116 is damaged during shipping or handling, it may no longer be possible for both centering protrusions 116 to engage the centering tool 111 simultaneously, thus alerting the user to the potential for the nut restrainer 101 to be misaligned. In some embodiments, a single centering protrusion 116 may engage with centering tool 111. If the single centering protrusion 116 incurred damage during shipping or handling, it may still engage the centering tool 111, thus giving the user the false impression that the nut restrainer 101 is properly aligned with bolt hole 110. Fourth, top plane 117 as illustrated in FIG. 1a may provide for a direct, and thus stiff and non-flexible connection with centering tool 111.

Figure 1B:
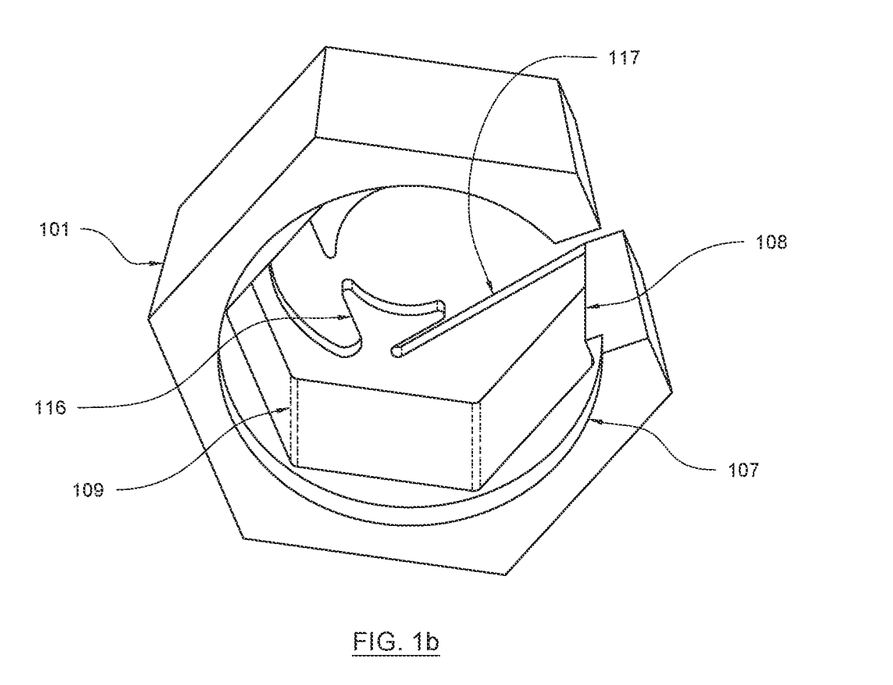
FIG. 1b illustrates a three-dimensional view of a nut restrainer according to embodiments of the invention from the bottom and side.

FIG. 1b illustrates a three-dimensional view of a nut restrainer according to embodiments of the invention from the bottom and side. This view illustrates exemplary nut restrainer 101, with the relative locations of circular profile 107, hexagonal profile 108, filleted vertices 109, top plane 117, and centering protrusions 116.

Figure 2A:
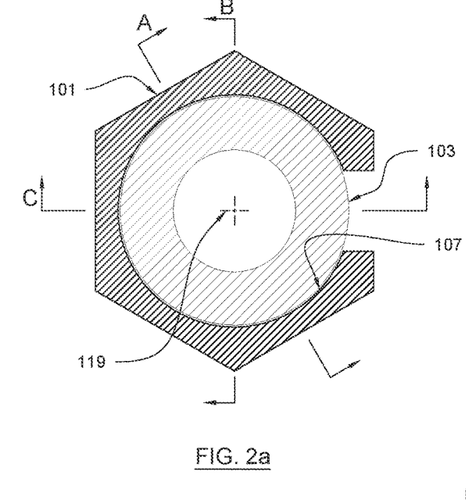
FIG. 2a illustrates a cross-sectional view of a nut restrainer with washer included.

FIG. 2a illustrates a cross-sectional view of a nut restrainer with washer included. FIG. 2a illustrates nut restrainer 101 with washer 103 included. FIG. 2a is illustrated as a cross-section cut perpendicular central axis 119 and through circular profile 107 of nut restrainer 101. FIG. 2a illustrates an exemplary relative arrangement of circular profile 107 and washer 103. The locations of section cut planes A, B, and C are illustrated in FIG. 2a, and are used in subsequent figures to identify the orientation of particular cross-sectional views.

Figure 2B:
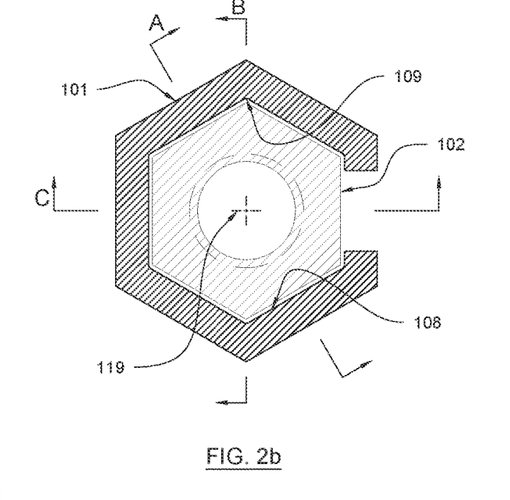
FIG. 2b illustrates a cross-sectional view of a nut restrainer with nut included.

FIG. 2b illustrates a cross-sectional view of a nut restrainer with nut included. FIG. 2b illustrates nut restrainer 101 with nut 102 included. The section is cut perpendicular central axis 119, and through regular hexagonal profile 108 of nut restrainer 101. FIG. 2b illustrates an exemplary relative arrangement of hexagonal profile 108, nut 102, and filleted vertices 109. Section cut planes A, B, and C are illustrated in FIG. 2b, and are used in subsequent figures to identify the orientation of particular cross sectional views.

Figure 2C:
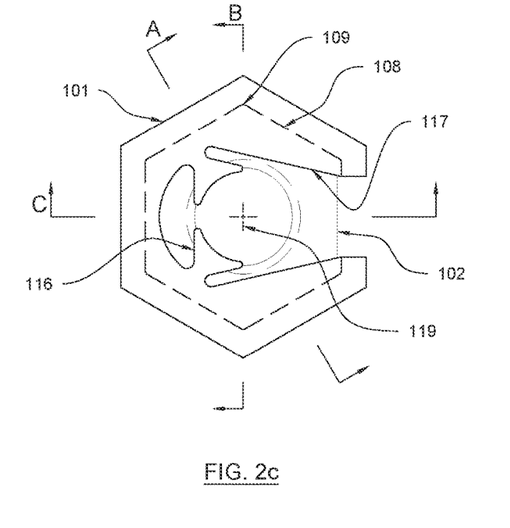
FIG. 2c illustrates a downward view of a nut restrainer with the nut included.

FIG. 2c illustrates a downward view of a nut restrainer with the nut included. The term 'downward view' with respect to nut restrainer 101 refers to a view looking parallel to central axis 119, in a direction that proceeds from top plane 117 towards circular profile 107 (The relative locations of top plane 117 and circular profile 107 are illustrated in at least FIGS. 3a, 3b and 3c). FIG. 2c illustrates nut restrainer 101 with nut 102 included. As illustrated in FIG. 2c, a dashed line indicates the outline of hexagonal profile 108 with filleted vertices 109 beneath top plane 117 in the foreground. As illustrated, the arcs at the tips of centering protrusions 116, which are nominally smaller than the interior diameter of nut 102, and concentric with central axis 119, are visible. As illustrated in FIG. 2c, the locations of section cut planes A, B, and C are included, and are used in subsequent figures to identify the orientation of particular cross-sectional views.

Figure 3A:
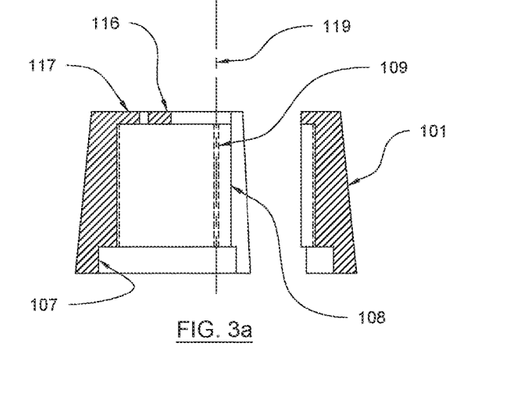
FIGS. 3a, 3b, and 3c illustrate cross-sectional views of a nut restrainer in isolation.
Figure 3B:
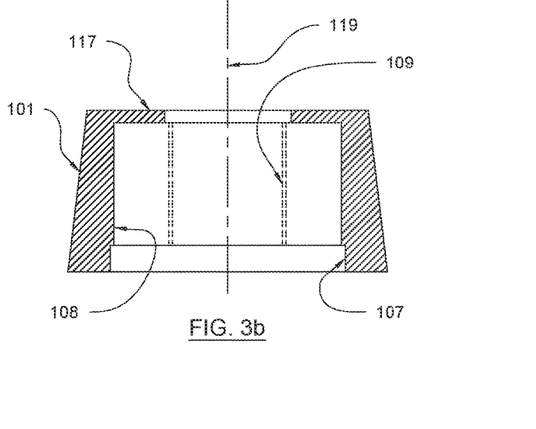
Figure 3C:
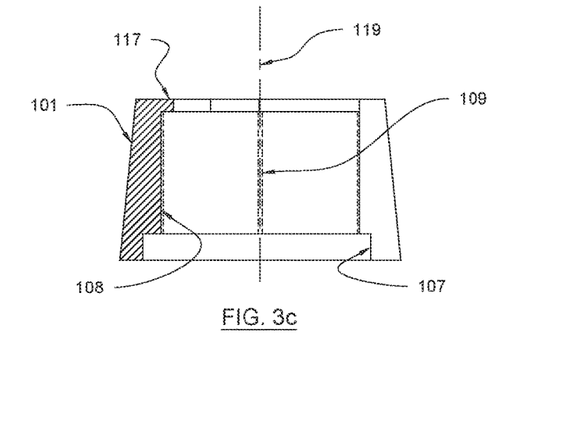

FIGS. 3a, 3b, and 3c illustrate cross-sectional views of a nut restrainer in isolation. FIG. 3a illustrates nut restrainer 101 in isolation. The view is oriented as indicated in cut plane A, as illustrated in all three views of FIG. 2. FIG. 3a illustrates the relative locations of circular profile 107, hexagonal profile 108, filleted vertices 109, and top plane 117. Centering protrusion 116 extending from an outer portion of top plane 117 towards central axis 119 is also visible.

FIG. 3b illustrates a cross-sectional view of nut restrainer 101 in isolation. The view is oriented as indicated in cut plane B, as illustrated in all three views of FIG. 2. The relative locations of circular profile 107, hexagonal profile 108, filleted vertices 109, and top plane 117 are illustrated. Central axis 119 is illustrated for reference.

FIG. 3c illustrates a cross-sectional view of nut restrainer 101 in isolation. The view is oriented as indicated in cut plane C, as illustrated in all three views of FIG. 2. FIG. 3c illustrates the relative locations of circular profile 107, hexagonal profile 108, filleted vertices 109, and top plane 117. Central axis 119 is illustrated for reference.

Figure 4A:
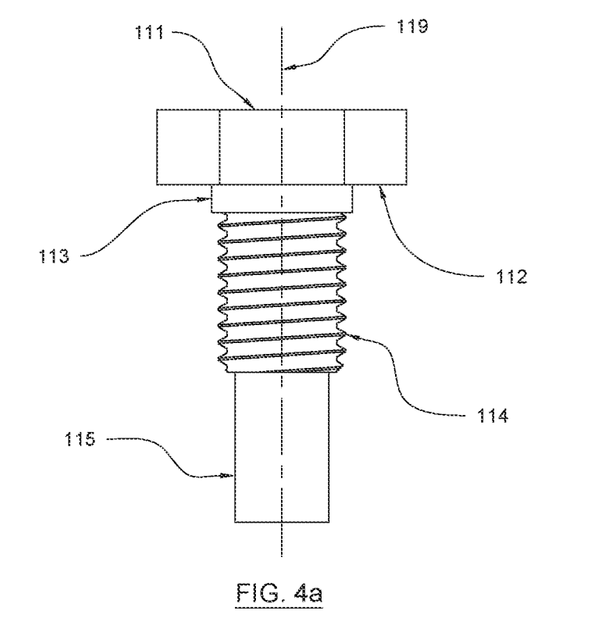
FIG. 4a illustrates a side view of a centering tool according to aspects of the invention.

FIG. 4a illustrates a side view of a centering tool according to aspects of the invention. A side view of centering tool 111 is illustrated in isolation showing the relative arrangement of, and relative qualitative widths of non-circular head 112, cylindrical positioning section 113, threaded section 114, and cylindrical restrainer positioning section 115. Central axis 119 is illustrated for reference.

Figure 4B:
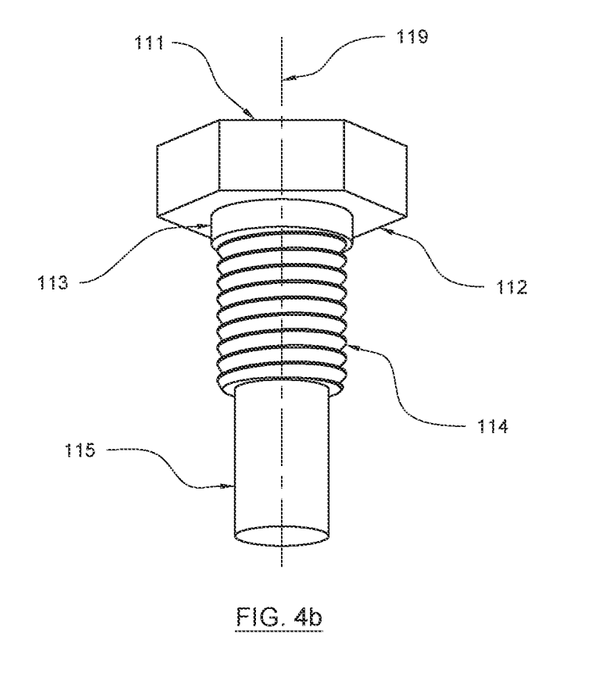
FIG. 4b illustrates a three-dimensional view of a centering tool according to aspects of the invention.

FIG. 4b illustrates a three-dimensional view of a centering tool according to aspects of the invention. A three-dimensional view of centering tool 111 in isolation is illustrated. FIG. 4b illustrates non-circular head 112, cylindrical positioning section 113, threaded section 114, and cylindrical restrainer positioning section 115. Central axis 119 is illustrated for reference.

Figure 5A:
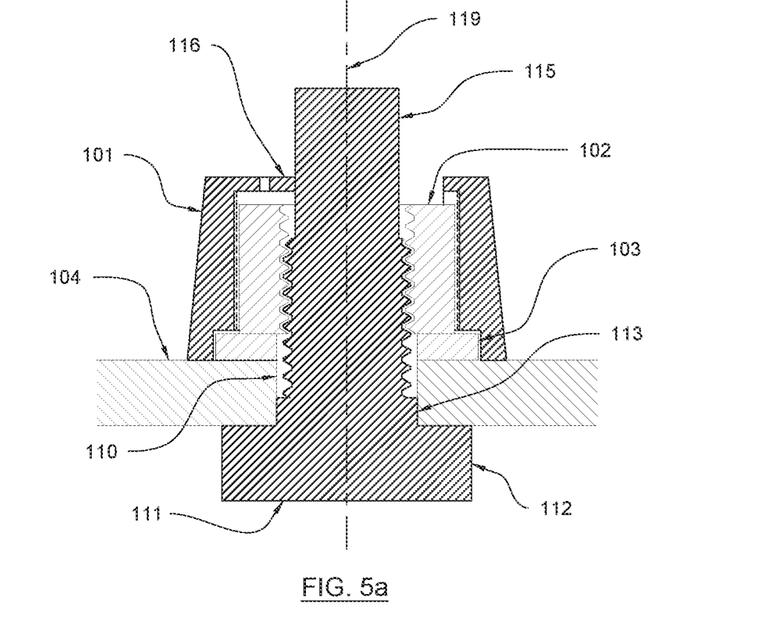
FIGS. 5a and 5b illustrate cross-sectional views showing the relative locations of, and connections between, the nut restrainer, nut, washer, substrate plate, and centering tool during the attachment of the nut restrainer to the substrate plate.
Figure 5B:
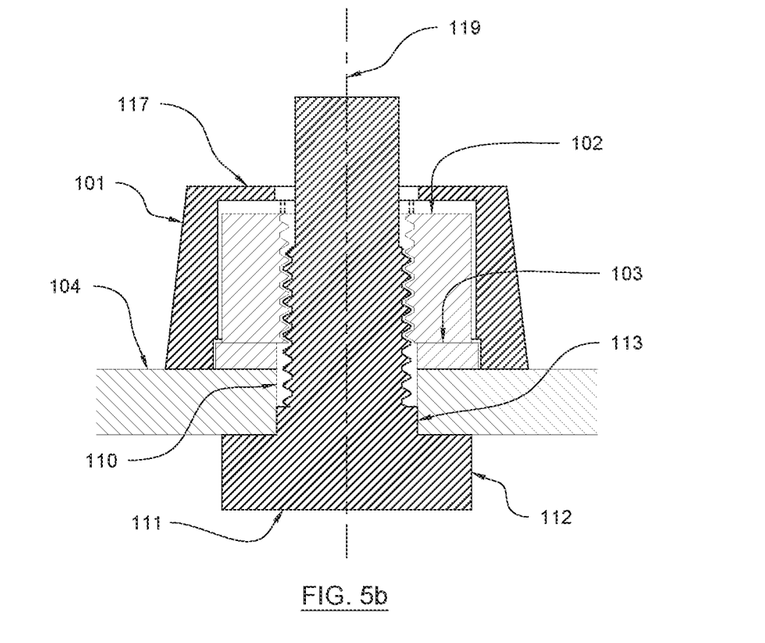

FIGS. 5a and 5b illustrate cross-sectional views showing the relative locations of, and connections between, the nut restrainer, nut, washer, substrate plate, and centering tool during the attachment of the nut restrainer to the substrate plate. FIG. 5a illustrates a cross-sectional view showing the relative locations of, and connections between, nut restrainer 101, nut 102, washer 103, substrate plate 104, and centering tool 111 during attachment of nut restrainer 101 to substrate plate 104. The view is oriented as indicated in cut plane A, as illustrated in all three views of FIG. 2. A tight fit between cylindrical positioning section 113 and bolt hole 110, and contact between edges of centering protrusions 116 and cylindrical restrainer positioning section 115, ensures that nut restrainer 101 is substantially aligned with central axis 119. Non-circular head 112 used to tighten (including hand-tighten) centering tool 111 with nut 102 is also illustrated.

FIG. 5b illustrates a cross-sectional view showing the relative locations of, and connections between, nut restrainer 101, nut 102, washer 103, substrate plate 104, and centering tool 111 during attachment of nut restrainer 101 to substrate plate 104. The view is oriented as indicated in cut plane B, as illustrated in all three views of FIG. 2. A tight fit between cylindrical positioning section 113 and bolt hole 110 helps ensure centering tool 111 is aligned with central axis 119. After nut restrainer 101 has been affixed to substrate plate 104, centering tool 111 can be removed, and nut 102 and washer 103 will be held within the interior of nut restrainer 101 by top plane 117. Non-circular head 112 used to tighten (including hand-tightening) centering tool 111 with nut 102 is also illustrated.

Figure 6A:
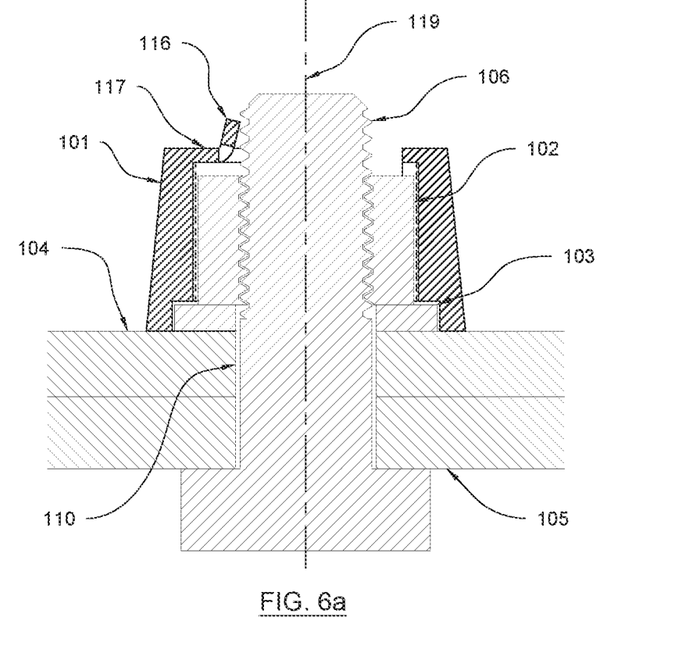
FIGS. 6a and 6b illustrate cross-sectional views showing the relative locations of, and connections between, the nut restrainer, nut, washer, substrate plate, fastened plate, bolt, and bolt hole after the bolt has been installed.
Figure 6B:
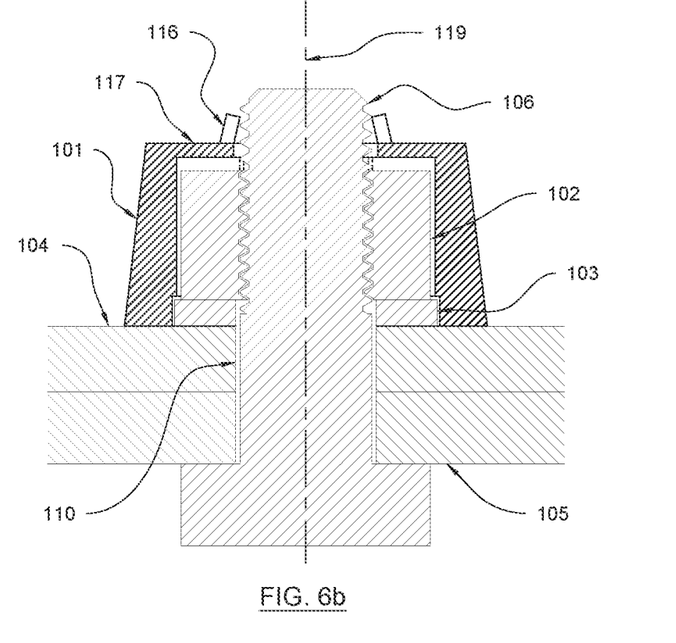

FIGS. 6a and 6b illustrate cross-sectional views showing the relative locations of, and connections between, the nut restrainer, nut, washer, substrate plate, fastened plate, bolt, and bolt hole after the bolt has been installed. FIG. 6a illustrates a cross-sectional view showing the relative locations of, and connections between, nut restrainer 101, nut 102, washer 103, substrate plate 104, fastened plate 105, bolt 106, and bolt hole 110. The view is oriented as indicated in cut plane A, as illustrated in all three views of FIG. 2. As illustrated in FIG. 6a, centering protrusion 116 has been bent upward relative to the balance of top plane 117 by bolt 106. Nut 102, washer 103, fastened plate 105, and bolt 106 are all depicted aligned with central axis 119, although the tolerance provided by nut restrainer 101 allows the various elements to be misaligned within the tolerance afforded by bolt hole 110.

FIG. 6b illustrates a cross-sectional view showing the relative locations of, and connections between, nut restrainer 101, nut 102, washer 103, substrate plate 104, fastened plate 105, bolt 106, and bolt hole 110. The view is oriented as indicated in cut plane B, as illustrated in all three views of FIG. 2. As illustrated in FIG. 6b, centering protrusion 116 has been bent upward relative to the balance of top plane 117 by bolt 106. Nut 102, washer 103, fastened plate 105, and bolt 106 are all depicted aligned with central axis 119, although the tolerance provided by nut restrainer 101 allows the various elements to be misaligned within the tolerance afforded by bolt hole 110.

Figure 7A:
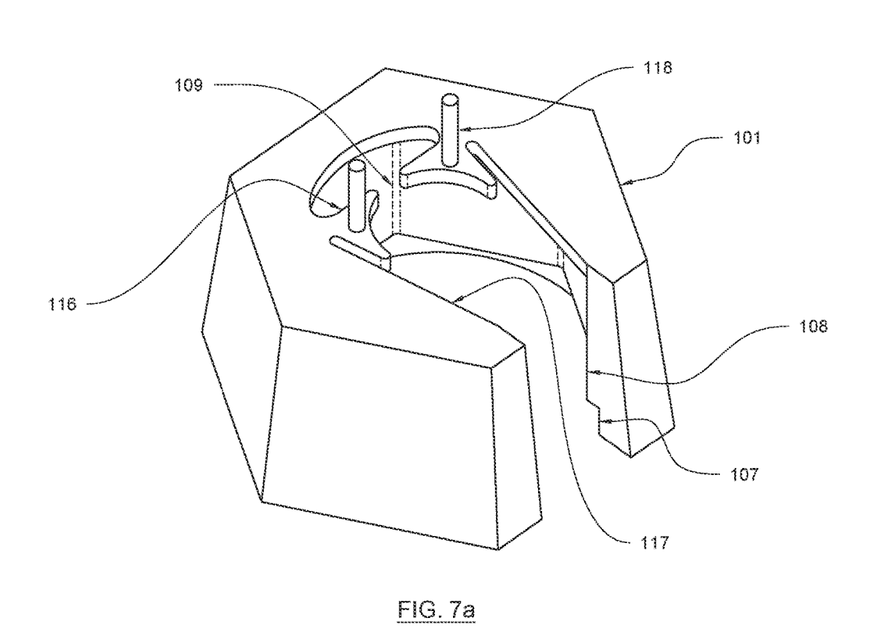
FIG. 7a illustrates a three-dimensional view of a nut restrainer according to another embodiment of the invention from the top and side.

FIG. 7a illustrates a three-dimensional view of a nut restrainer according to another embodiment of the invention from the top and side. The embodiment of the invention in FIG. 7a is identical to that illustrated in FIG. 1a, except that indicator pins 118 are connected to the centering protrusions 116. Indicator pins 118, substantially parallel with the central axis prior to bolt installation, will rotate when the centering protrusions 116 are bent by the tip of the bolt. The rotation of the indicator pins 118 may provide a visual indicator that the bolt 106 (illustrated in at least FIGS. 6a, 6b, and 7c) has passed all the way through nut 102 (illustrated in at least FIGS. 5a, 5b, 6a, 6b, and 7c). The relative locations of the nut restrainer 101, circular profile 107, hexagonal profile 108, filleted vertices 109, and top plane 117 are also illustrated.

Figure 7B:
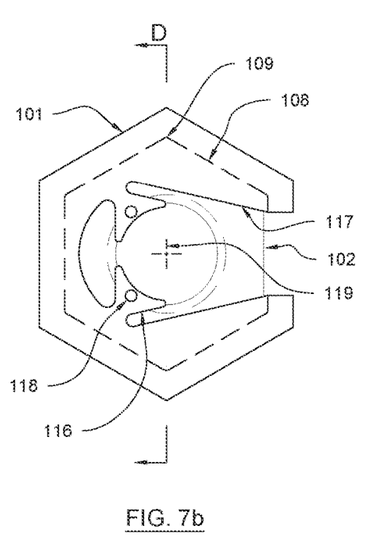
Figure 7C:
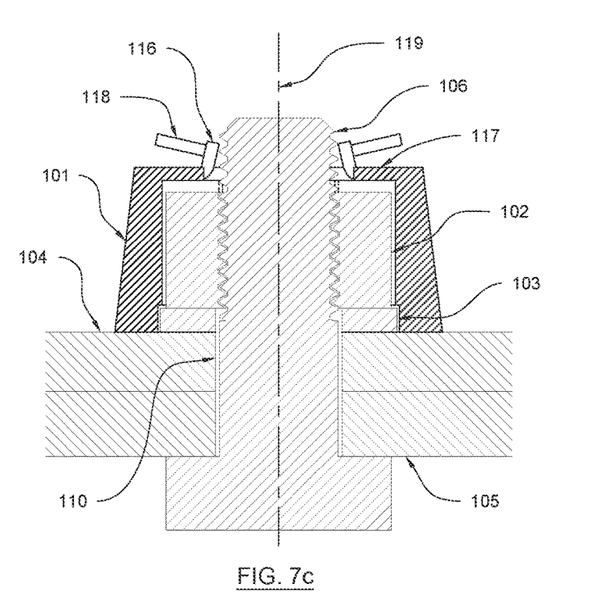

FIGS. 7b and 7c illustrate a downward view and cross sectional view, respectively, of the embodiment of the invention shown in FIG. 7a. FIG. 7b illustrates a downward view of nut restrainer 101 with nut 102 included. FIG. 7b is identical to FIG. 2c, except that indicator pins 118 are included. A dashed line indicates the outline of the hexagonal profile 108 with filleted vertices 109 beneath the top plane 117 in the foreground. The centering protrusions 116, and the balance of the top plane 117 are also illustrated. The location of section cut plane D is included in this figure and is used to identify the orientation of the sectional view shown in FIG. 7c. The location of the central axis 119 is illustrated for reference.

FIG. 7c illustrates a cross sectional view showing the relative locations of, and connections between, the nut restrainer 101, nut 102, washer 103, substrate plate 104, fastened plate 105, bolt 106, and bolt hole 110. The view is oriented as indicated in cut plane D, as illustrated in FIG. 7b. The centering protrusions 116 have been bent upward relative to the balance of the top plane 117 by the bolt 106, thus rotating the indicator pins 118 so that they are no longer parallel to the central axis 119 as they were prior to inserting the bolt 106.

Figure 8A:
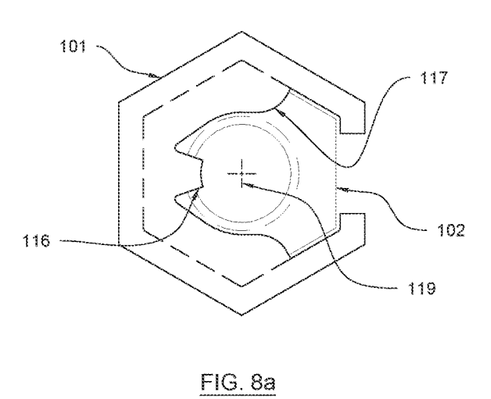
FIGS. 8a through 8d illustrate downward views of various embodiments of nut restrainers with centering protrusions.

FIGS. 8a through 8d illustrate downward views of various embodiments of nut restrainers with centering protrusions. FIG. 8e illustrates a sectional view of the embodiment illustrated in FIG. 8d. FIG. 8a illustrates a downward view of nut restrainer 101 including nut 102, showing an alternate form of top plane 117 with a single centering protrusion 116. Centering protrusion 116 of FIG. 8a is tapered as it extends toward central axis 119 and is sufficiently narrow to ensure that it will bend, and not impede bolt 106 (illustrated in at least FIGS. 6a and 6b) as bolt 106 extends past top plane 117. This form of centering protrusion 116 may be easier to manufacture than the form shown in FIG. 2c. This form of centering protrusion 116 engages a smaller portion of the cylindrical restrainer positioning section 115 of centering tool 111 (illustrated in at least FIGS. 4a and 4b) than the form shown in FIG. 2c, which may make it more difficult for the user to maintain nut restrainer 101 in the proper location while affixing it to substrate plate 104 (illustrated in at least FIGS. 5a, 5b, 6a and 6b).

Figure 8B:
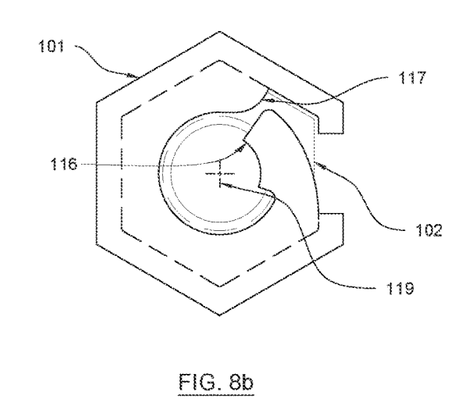
Figure 8C:
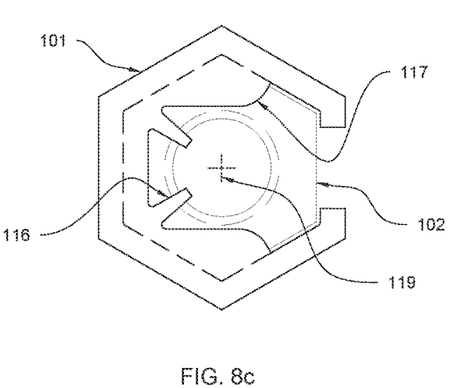

FIG. 8b illustrates a downward view of nut restrainer 101 including nut 102, showing an alternate form of top plane 117 with a single asymmetric centering protrusion 116. Centering protrusion 116 of FIG. 8b is formed and oriented so that when bolt 106 (illustrated in at least FIGS. 6a and 6b) extends past top plane 117, bolt 106 will force centering protrusion 116 into an approximately spiral shape, causing the portion of centering protrusion 116 that engages with cylindrical restrainer positioning section 115 of centering tool 111 (illustrated in at least FIGS. 4a and 4b) to engage with the threads of bolt 106. Said behavior may improve the overall performance of nut restrainer 101 because centering protrusion 116 needs only to deform enough to match the diameter of the inner portion of the thread of bolt 106, rather than deforming enough to match the outer diameter of bolt 106, as in other centering protrusion 116 forms. By reducing the required deformation of centering protrusion 116, top plane 117 may be thicker and thus more robust than in some other forms. Central axis 119 is also illustrated FIG. 8c illustrates a downward view of nut restrainer 101 including nut 102, showing an alternate form of top plane 117 and centering protrusions 116. Centering protrusions 116 as illustrated in FIG. 8c are tapered as they extend toward central axis 119 and are sufficiently narrow to ensure that they will bend, and not impede bolt 106 (illustrated in at least FIGS. 6a and 6b) as bolt 106 extends past top plane 117. This form of centering protrusion 116 may be easier to manufacture than the form shown in FIG. 2c. This form of centering protrusion 116 engages a smaller portion of cylindrical restrainer positioning section 115 of centering tool 111 (Illustrated in at least FIGS. 4a and 4b) than the form shown in FIG. 2c, which may make it more difficult for the user to maintain the nut restrainer 101 in the proper location while affixing it to substrate plate 104.

Figure 8D:
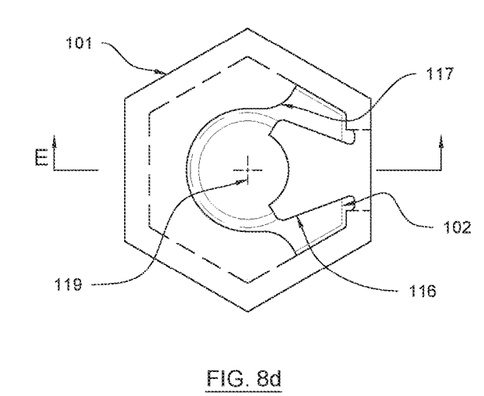
Figure 8E:
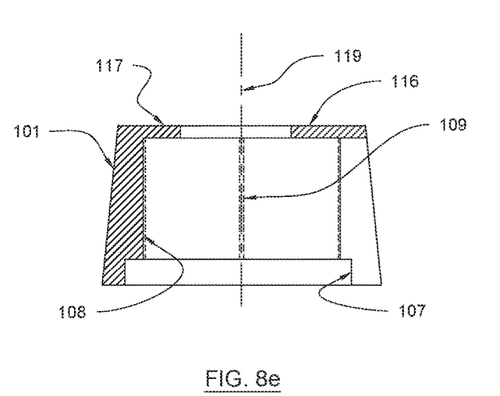
FIG. 8e illustrates a sectional view of the embodiment illustrated in FIG. 8d.

FIG. 8d illustrates a downward view of nut restrainer 101 including nut 102, showing an alternate form of top plane 117 and a single centering protrusion 116. Centering protrusion 116 as illustrated in FIG. 8d is separated from the balance of top plane 117, and is connected to the balance of nut restrainer 101 by isthmuses. When connected thusly, the displacement of centering protrusion 116 caused by passing bolt 106 (illustrated in at least FIGS. 6a and 6b) will cause the material within the isthmus-shaped connection of centering protrusion 116 to the balance of nut restrainer 101 to deform in a torsional mode. This differs from the behavior of the isthmus-shaped connection illustrated in FIG. 2c, which would deform in a bending mode. Said torsional deformation of the connection between centering protrusion 116 and the balance of nut restrainer 101 may allow top plane 117 to be thicker than would be possible with the configuration shown in FIG. 2c, thus making nut restrainer 101 more robust. Section cut plane E is illustrated in FIG. 8d, and is used in FIG. 8e to identify the orientation of the cross sectional view. Central axis 119 is also illustrated.

FIG. 8e illustrates a cross sectional view of the embodiment of nut restrainer 101 illustrated in FIG. 8d. The view is oriented as indicated in cut plane E, as illustrated in FIG. 8d. The relative locations of nut restrainer 101, circular profile 107, hexagonal profile 108, filleted vertices 109, centering protrusion 116, top plane 117 and central axis 119 are illustrated.

Freedom of Movement. Freedom of movement is a condition characterized by a lack of material included as part of the nut restrainer, that would by its presence, prevent the translation or movement of a nut in one or more directions. Freedom of movement may be bounded by the presence of material included as part of the nut restrainer that prevents a nut from moving beyond set limits. Where freedom of movement is said to be equal to a certain value in one or more directions, that value may be measured by the distance from an initial position of a nut to the point where the nut comes in contact with the nut restrainer, where the initial position may be considered to be any position in which the nut is coaxial with a central axis, located between the top plane and a substrate plate, and in which the exterior faces of the nut are parallel to the adjacent faces of hexagonal profile.

Central Axis. A line substantially perpendicular to the substrate plate and passing through the center of the bolt hole.

Lateral direction. A lateral direction is any direction substantially perpendicular to a central axis.

Tolerance. Half of the difference of the diameter of a bolt hole and the diameter of a bolt that is to be inserted into the bolt hole.

Minimum amount sufficient to accommodate washer size variation. A minimum amount sufficient to accommodate washer size variation represents a scalar quantity of length corresponding to the difference between the largest actual outer diameter of a washer that could be appropriately inserted into a nut restrainer and the nominal outer diameter of such a washer. For washers in accordance with specific dimensional standards (including, but not limited to, standard F436 published by ASTM), the minimum amount sufficient to accommodate washer size variation will be the positive outer diameter tolerance plus a nominal distance to prevent the washer from binding within the circular profile.

As will be realized, the systems and methods disclosed herein are capable of other and different embodiments and its several details may be capable of modifications in various respects, all without departing from the invention as set out in the appended claims. Accordingly, the drawings and description are to be regarded as illustrative in nature and not in a restrictive or limiting sense with the scope of the application being indicated in the claims.

What is claimed is:

1. A nut restrainer configured to receive a nut, the nut restrainer comprising:
    a shaped portion configured and structured with an interior profile and a top plane;
    the interior profile is configured and structured with a profile section to receive the nut;
    the interior profile is further configured and structured to restrain the nut with a limited freedom of movement in at least one lateral direction; and
    at least one centering protrusion configured and structured to bend so as not to impede receiving a tip of a bolt,
    wherein the nut restrainer is configured to confine the nut therein;
    wherein the nut restrainer is configured to be affixed to a substrate plate that has a bolt hole;
    wherein the nut restrainer is configured to be affixed to the substrate plate over the bolt hole and receive subsequent installation of a bolt with access from only one side of the substrate plate; and
    wherein the nut restrainer is configured to be affixed to the substrate plate via welding.

2. The nut restrainer of claim 1, wherein the nut restrainer is configured to provide alignment with the bolt hole; and wherein the at least one centering protrusion is configured to ensure that portions of the nut restrainer are substantially aligned with a central axis.

3. The nut restrainer of claim 1, wherein the at least one centering protrusion is configured to extend from an outer portion of a top plane of the shaped portion towards a central axis of the nut restrainer.

4. The nut restrainer of claim 1, wherein the nut restrainer is configured to provide a nut and bolt connection with a tolerance that allows the nut and the bolt to be misaligned within the tolerance.

5. The nut restrainer of claim 1, wherein the at least one centering protrusion is configured with an arced inner portion.

6. The nut restrainer of claim 1, wherein the nut restrainer is configured to receive a bolt that comprises a threaded bolt and the nut that comprises a regular hexagonal profile.

7. The nut restrainer of claim 1, wherein the nut restrainer is configured to prevent translation or movement of the nut.

8. The nut restrainer of claim 1, wherein the nut restrainer is configured to confine the nut to provide installation of bolted connections with access from only one side.

9. The nut restrainer of claim 1, wherein the shaped portion further comprises a circular profile section structured and configured to accommodate a washer.

10. The nut restrainer of claim 1, wherein the at least one centering protrusion is connected to a balance of a material of the nut restrainer by an isthmus.

11. A nut restrainer configured to receive a nut, the nut restrainer comprising:
    a shaped portion configured and structured with an interior profile and a top plane;
    the interior profile is configured and structured with a profile section to receive the nut;
    the interior profile is further configured and structured to restrain the nut with a limited freedom of movement in at least one lateral direction; and
    at least one centering protrusion configured and structured to bend so as not to impede receiving a tip of a bolt,
    wherein the nut restrainer is configured to confine the nut therein;
    wherein the nut restrainer is configured to be affixed to a substrate plate that has a bolt hole;
    wherein the nut restrainer is configured to be affixed to the substrate plate over the bolt hole and receive subsequent installation of the bolt with access from only one side of the substrate plate; and
    wherein the nut restrainer is configured to be directly affixed to the substrate plate.

12. The nut restrainer of claim 11, wherein the nut restrainer is configured to provide alignment with the bolt hole; and wherein the at least one centering protrusion is configured to ensure that portions of the nut restrainer are substantially aligned with a central axis.

13. The nut restrainer of claim 11, wherein the at least one centering protrusion is configured to extend from an outer portion of a top plane of the shaped portion towards a central axis of the nut restrainer.

14. The nut restrainer of claim 11, wherein the nut restrainer is configured to provide a nut and bolt connection with a tolerance that allows the nut and the bolt to be misaligned within the tolerance.

15. The nut restrainer of claim 11, wherein the nut restrainer is configured to receive the nut that comprises a regular hexagonal profile; and wherein the nut restrainer is configured to be affixed to the substrate plate via welding.

16. The nut restrainer of claim 11, wherein the nut restrainer is configured to receive the bolt that comprises a threaded bolt and the nut that comprises a regular hexagonal profile.

17. The nut restrainer of claim 11, wherein the nut restrainer is configured to prevent translation or movement of the nut.

18. The nut restrainer of claim 11, wherein the nut restrainer is configured to confine the nut to provide installation of bolted connections with access from only one side.

19. The nut restrainer of claim 11, wherein the shaped portion further comprises a circular profile section structured and configured to accommodate a washer.

20. The nut restrainer of claim 11, wherein the nut restrainer is configured and structured such that no nut restrainer material prevents direct contact between any one of the following: the nut and a washer, the washer and a substrate material, a shank of the bolt and the substrate plate, and/or a shank of the bolt a fastened plate.

* * * * *